(12) United States Patent
Lesniak et al.

(10) Patent No.: US 6,441,972 B1
(45) Date of Patent: Aug. 27, 2002

(54) OPTICAL IMAGE SEPARATOR

(76) Inventors: Jon R. Lesniak, 1605 Brynwood Dr., Madison, WI (US) 53716; Eann Alexander Patterson, University of Sheffield Mappin Street, Sheffield (GB), S1 3JD ( * ) Notice: Subject to any disclaimer, the term of this patent is extended or adjusted under 35 U.S.C. 154(b) by 0 days.

(21) Appl. No.: 09/592,713

(22) Filed: Jun. 13, 2000

(51) Int. Cl.⁷ .................. G02B 27/14; G02B 17/00; G02B 9/34; H01S 3/08
(52) U.S. Cl. .............. 359/741; 359/732; 359/733; 359/799; 359/629; 372/105; 356/419
(58) Field of Search .................. 359/741, 732, 359/733, 734, 735, 737, 726, 731, 799, 618, 619, 629; 372/105; 356/419, 326; 250/226

(56) References Cited

U.S. PATENT DOCUMENTS

| | | | | |
|---|---|---|---|---|
| 3,659,918 A | * | 5/1972 | Tan | 313/371 |
| 4,012,147 A | * | 3/1977 | Walrafen | 356/75 |
| 4,517,456 A | * | 5/1985 | Halsall et al. | 250/226 |
| 5,206,502 A | * | 4/1993 | Gardner | 250/226 |
| 5,363,170 A | * | 11/1994 | Muraki | 355/67 |
| 5,926,283 A | | 7/1999 | Hopkins | 356/419 |
| 5,982,497 A | | 11/1999 | Hopkins | 356/419 |
| 6,055,053 A | | 4/2000 | Lesniak | 356/366 |
| 6,141,150 A | * | 10/2000 | Ushiyama et al. | 359/618 |

OTHER PUBLICATIONS

Glenn Zorpette, Working Knowledge: Focusing in a Flash, Scientific American, Aug. 2000 at 82, 83.

* cited by examiner

Primary Examiner—Georgia Epps
Assistant Examiner—Tim Thompson
(74) Attorney, Agent, or Firm—Lathrop & Clark LLP

(57) ABSTRACT

An optical assembly divides a single image into a plurality of images which are simultaneously projected onto a single sensor array. The optical assembly is arranged so that each of the plurality of images can be made to pass through a filter of a different type. For example a polarizing filter of a different orientation, or a filter which passes a different spectral band. In this way a single digital camera having a single chip sensor array can simultaneously receive multiple substantially identical images which have been acted on by different filters. This allows data capture from a single frame of a single camera to be used to perform stress analysis, or spectral analysis. This is particularly useful when high speed image capture is desired which contains stress or spectral data, because each frame captured from the sensor array contains multiple images which can be processed to obtain stress or spectral data.

33 Claims, 4 Drawing Sheets

OPTICAL IMAGE SEPARATOR

CROSS REFERENCES TO RELATED APPLICATIONS

Not Applicable.

STATEMENT AS TO RIGHTS TO INVENTIONS MADE UNDER FEDERALLY SPONSORED RESEARCH AND DEVELOPMENT

Not Applicable.

BACKGROUND OF THE INVENTION

This invention relates to an optical image separator, a strain analysis device and to reflection polariscopes for the stress analysis of a component. Typical uses are in the aeronautical, automobile or glass industries to facilitate stress analysis of real components. Applicability includes crack detection and analysis; residual stress evaluation; operation in static, cyclic and dynamic events and provision of full-field principal strain data.

In Journal of Strain Analysis, 33(1): 1–16, 1998, is an Article by E. A. Patterson, and Z. F. Wang entitled "Simultaneous observation of phase-stepped images for automated photoelasticity". In U.S. Pat. No. 5,978,087 Nov. 2, 1999 a technique for simultaneous capture of phase-stepped images is described using beam-splitting devices. Also in the Proceedings of the International Conference on Photoelasticity: New Instrumentation & Data Processing Techniques, published by SIRA, London, (1): 1–6 is an Article by S. J. Haake and E. A. Patterson entitled "Photoelastic analysis using a full-field spectral contents analyser" wherein is described a technique for sequential capture of images for the purpose of spectral contents analysis.

U.S. Pat. No. 6,055,053 entitled Full Field Photoelastic Stress Analysis, which is incorporated herein by reference, discloses an apparatus for producing four images of an object undergoing stress; however, because the images are not brought to a single plane four cameras are required to obtain the images required to perform stress analysis.

SUMMARY OF THE INVENTION

An optical assembly divides a single image into a plurality of images which are simultaneously projected onto a single sensor array. The optical assembly is arranged so that each of the plurality of images can be made to pass through a filter of a different type. For example, a polarizing filter of a different orientation, or a filter which passes a different spectral band. In this way a single digital camera having a single chip sensor array can simultaneously receive multiple substantially identical images which have been acted on by different filters. This allows data capture from a single frame of a single camera to be used to perform stress analysis, or spectral analysis. This is particularly useful when high speed image capture is desired which contains stress or spectral data, because each frame captured from the sensor array contains multiple images which can be processed to obtain stress or spectral data.

According to the first aspect of the present invention there is provided an optical image separator comprising:

1. an objective lens partitioned into n parts, where n is an integer greater than one, such that the objective lens is capable of reproducing n output beams from one input beam;
2. an optical element placed either before or after the objective lens and partitioned into n parts for each said output beam such that each part has a different effect on the state of polarization; and
3. a recording device for the simultaneous capture of the n images formed by the n output beams.

According to the second aspect of the device, the beam splitting can be achieved by the insertion of n wedges in the light path adjacent to the objective lens, which need not then be partitioned.

According to the third aspect of the invention, the optical element introduces equal changes of polarization into the n images and a bandwidth filter is provided for each image where the central wavelength of each filter are all different so that full-field spectral contents analysis can be performed using the resultant images.

According to the fourth aspect of the invention, there is provided a polarimetric device for stress or chemical analysis comprising an optical image separator as defined above and a source of polarized light.

According to the fifth aspect of the invention there is provided a reflection polariscope comprising an optical image separator as defined above and a source of polarized light.

According to the sixth aspect of the invention a polarized white light is used, with the bandwidth filter removed and the recording device is capable of recording color images.

Further objects, features and advantages of the invention will be apparent from the following detailed description when taken in conjunction with the accompanying drawings.

DESCRIPTION OF THE PREFERRED EMBODIMENTS

Figure 1:
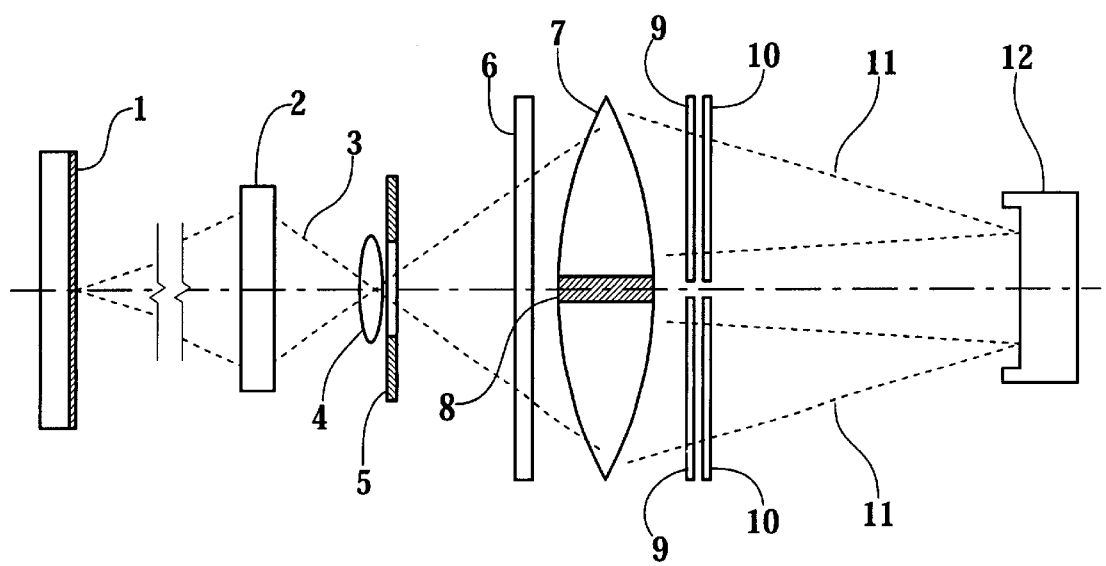
FIG. 1 is a plan view of a preferred embodiment of the optical image separator of this invention.

Preferably, the objective lens is capable of producing output beams, preferably of equal intensity, whilst the recording device is preferably a digital camera. Whilst the objective lens could consist of a Fresnel lens, preferably the objective lens is an achromatic glass lens physically cut into, preferably four, segments of preferably equal size and shape. The segments should be moved outwards from the center of the lens in a radial direction, by preferably equal amounts and held in these positions, preferably permanently. The partitioned objective lens generates a set of images that are simultaneously in focus on a single plane in the recording device.

From the practical viewpoint, alignment and focusing of the assembly is much simplified if the optical components are mounted in a machined tube. It is preferred if at the output end of the tube a fitting is provided for attachment to the recording device, and at the input end of the tube an aperture is provide of a shape corresponding to the active area of the recording device. It is preferable to provide a condensing lens in the input aperture.

Alternatively, with the second aspect of the device a set of preferably four wedges can be introduced in the light path before the objective lens. These wedges serve the purpose of generating four beams in the same manner of the partitioned lens. When a wedge is divided into segments, the gradient of the each segment can be arranged such the light emitted from it is directed to form a particular image at the recording device. Each image is the sum of energy received from appropriate segments of each wedge. Furthermore it is possible to compound the wedges, those skilled in the art will appreciate that many combinations are feasible.

With the third aspect of the device eight output images are preferred.

With the device of the fourth aspect, the object to be examined, e.g. chemical analysis, may itself have a polarized light source.

With the fifth aspect, the polariscope, the light source is conveniently a quartz tungsten halogen lamp and may be used in a reflective or direct mode.

The optical image separator in accordance with the first aspect of the invention produces four monochromatic images that are registered by a recording device. The images are phase-stepped and allow the relative retardation and isoclinic angle to be evaluated for the object being viewed. Subsequent data processing allows the relative retardation to be converted from a periodic map to a continuous map of isochromatic fringe order, but a calibration at two points is required to produce unambiguously a map of absolute isochromatic fringe order. This calibration is provided manually by the operator and is thus potentially subject to error.

In the sixth aspect, the use of an RGB camera allows automatic calibration of the fringe order up to to about 3, using a simplified form of spectral analysis utilizing the method described in the Journal of Strain Analysis 34(1): 59–64, 1999 in an Article by E. A. Patterson and Z. F. Wang, entitled "Integration of spectral and phase-stepping methods in photoelasticity".

According to the third aspect of the device, eight simultaneous measurements can be made portioning the objective lens into eight parts and providing each part with a bandwidth filter. The central bandwidth of the filters should be all different to allow a spectrum to be defined. Recent research has shown that eight wavelengths are sufficient to allow absolute fringe orders up to approximately 6 to be measured reliably. All the images can be recorded simultaneously using a monochromatic camera. When the quarter wave plate and polarizer are omitted, full-field spectral analysis can be performed in ordinary light.

The optical image separator in FIG. 1 is designed to simultaneously produce four images from a single object 1, with the separator being intended in one mode for operation associated with a source of polarized light so as to constitute a reflection polariscope.

Figure 2:
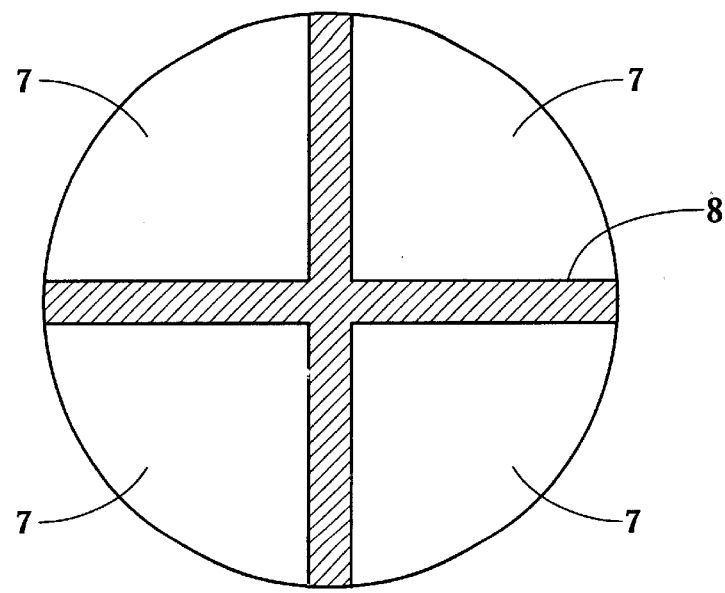
FIG. 2 is a diagrammatic view of the partitioned objective lens.

FIGS. 1 and 2 show a simple arrangement in which an objective lens 7 has been divided into four parts which have been moved radially outwards and fixed in this position for instance by an adhesive filler 8. This arrangement causes the lens to produce four nominally identical beams 11 that form separate images at the recording device 12. The quantity of radial movement controls the amount of separation of the images formed at 12. Rotation of the objective lens causes the images to process about the center of rotation.

In FIG. 1 a relay lens 2 has been inserted for the purpose of producing a single input image that is projected onto the divided objective lens 7. A condensing lens 4 has been provided at the image position of the relay lens 2. A field stop or aperture 5 has been provided to prevent superposition of the translated images. A bandwidth filter 6 has been inserted before the objective lens. Partitioned quarter-wave plate 9 and polarizer 10 (acting as an analyzer) are inserted after the objective lens 7. Each part of the quarter wave plate 9 and polarizer 10 has a different orientation such that the four images are phase-shifted relative to each other.

Figure 3:
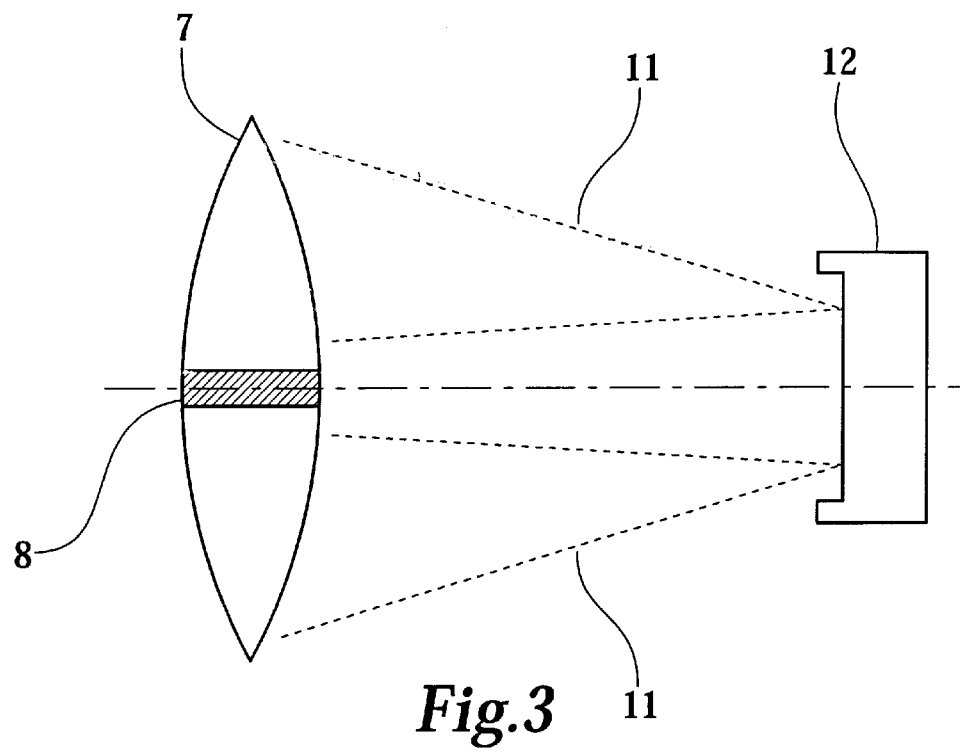
FIG. 3 is a diagrammatic view of the partitioned objective lens and the recording device.
Figure 4:
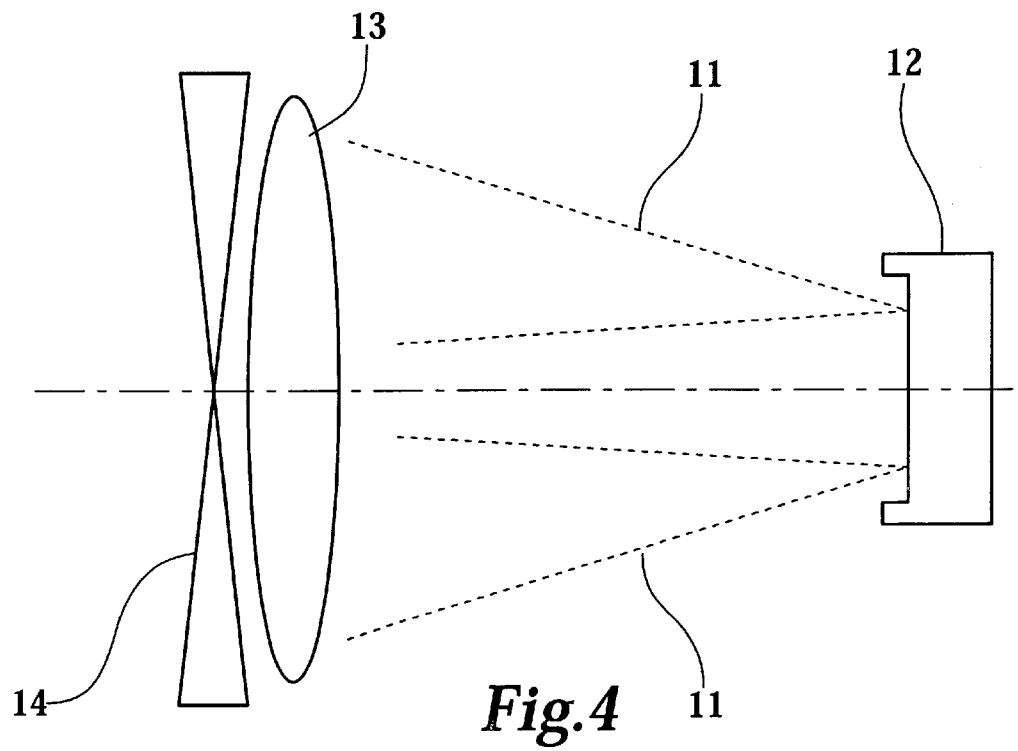
FIG. 4 is a diagrammatic view of the second aspect of the device illustrating the use of wedge prisms with an objective lens.

FIG. 3 shows the partitioned objective lens and recording device with the other optical elements removed for clarity of the diagram. In FIG. 4 an alternative embodiment is shown in which the partitioned objective lens is replaced by a complete objective 13 and set of wedge prisms 14.

Figure 5:
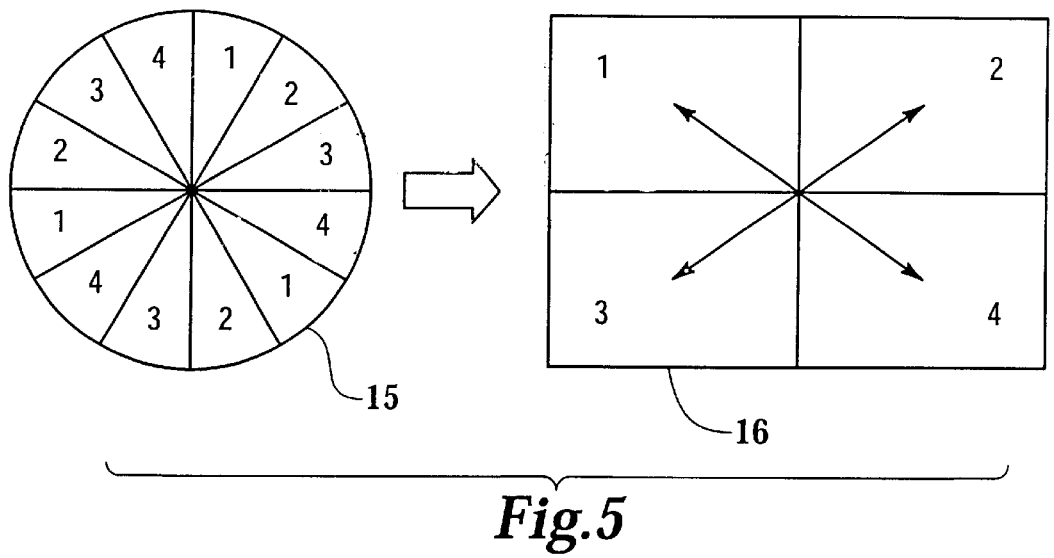
FIG. 5 is a schematic of wedge segments (left) and resultant images formed by the device (right).

In FIG. 5 is shown a set of twelve wedge segments 15 that generate light beams, which contribute to four images 16 formed at the recording device. The gradients of the segments are such that each wedge contributes to each image. The numbering on the segments indicates the image to which the light passing through the segment will contribute.

Figure 6:
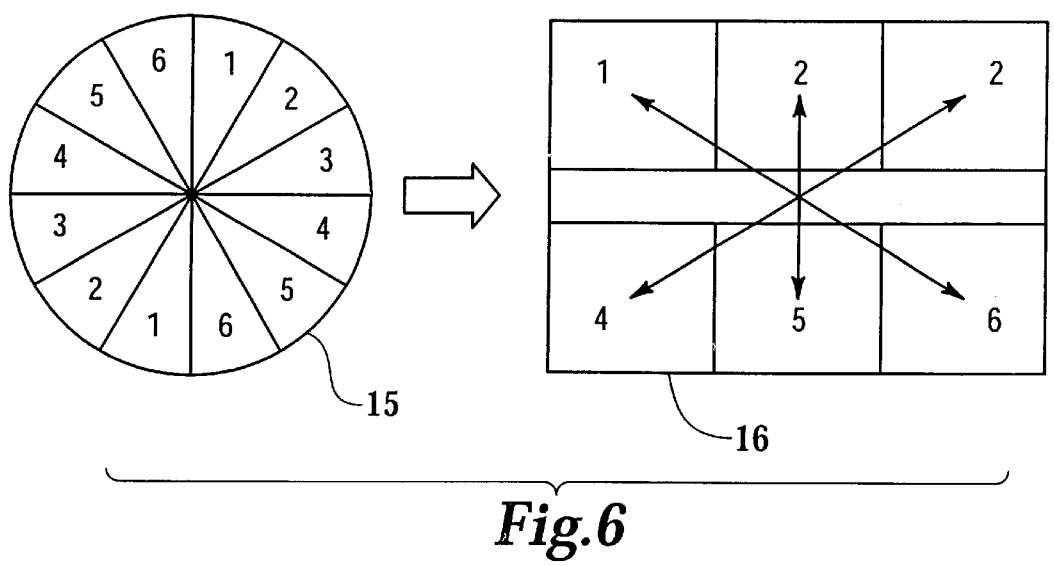
FIG. 6 is an alternative arrangement of wedge segments (left) and the resultant images formed by the device (right).
Figure 7:
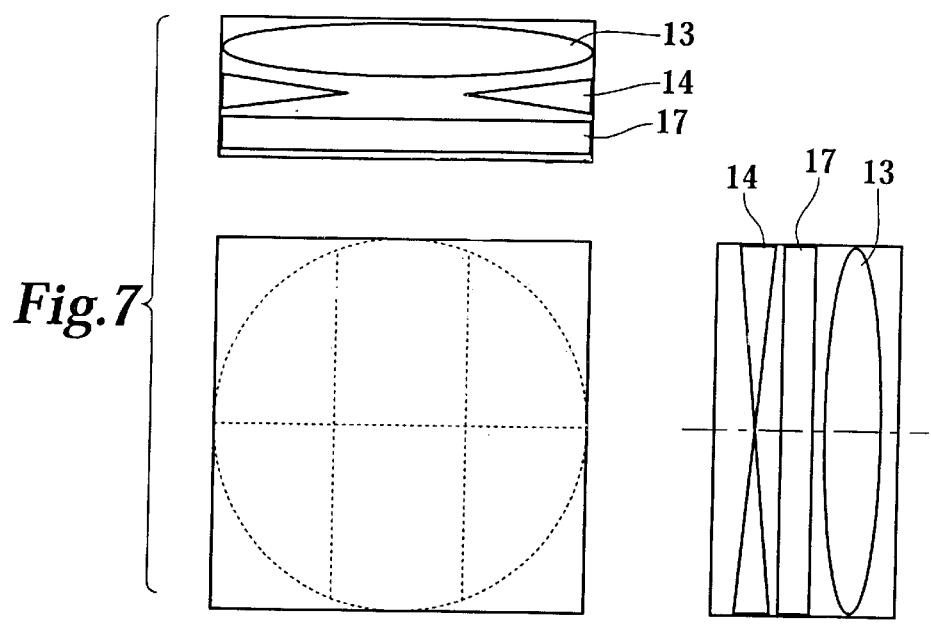
FIG. 7 is a plan view and projections of a compound wedge arrangement for producing the images in FIG. 6

In FIG. 6 an alternative arrangement of the wedge prisms 15 is shown which generates six images 16 at the recording device. This is a compound wedge and is shown in more detail in FIG. 7.

Figure 8:
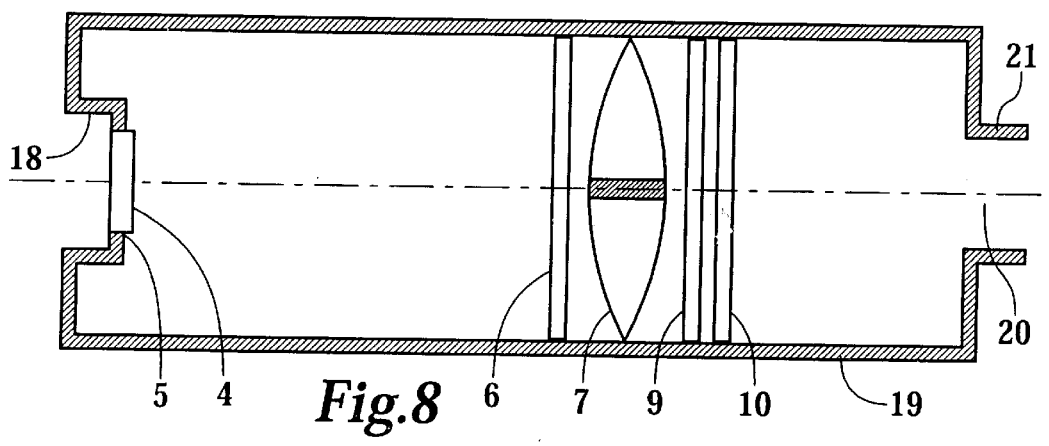
FIG. 8 is a schematic layout of a preferred embodiment of the optical image separator mounted within a machined tube, and arranged as a part of a phase-stepping polariscope.

In FIG. 8 the optical image separator is shown mounted in a machined tube 19. The tube has a fitting 18 at the input end to receive a standard camera lens. The fitting is arranged such that the camera lens will produce a single image at the aperture 5. A condensing lens 4 is provided in the aperture 5 in order to reduce the length of the optical apparatus. The bandwidth filter 6, partitioned objective lens 7, quarter wave plate 9 and polarizer 10 are mounted in the tube. The output end of the tube contains an aperture 20 and a further fitting 21 to which can be attached a recording device such as a CCD camera, a CCTV, or a high-speed camera. Thus the optical image separator mounted in such a tube 19 can be located in a similar manner to an extension tube in photography.

The location of the quarter wave plate 9 and polarizer 10 should be selected so that they are used under near-normal beam incidence. Many combinations of orientation will work, as will be appreciated by persons skilled in the art.

Figure 9:
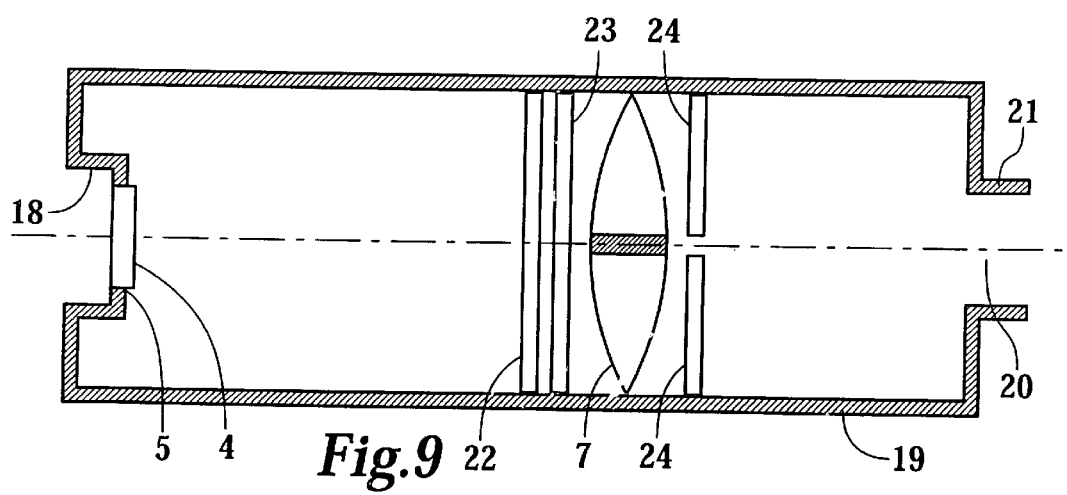
FIG. 9 is a schematic layout of a preferred embodiment of the optical image separator mounted within a machined tube, and arranged for spectral contents analysis.

In FIG. 9 an alternative embodiment is shown such that the optical image separator can be used for spectral contents analysis. A single quarter wave plate 22 and polarizer 23 (acting as an analyzer) are located in the tube 19 and a bandwidth filter 24 is located in each output light paths. The central wavelength of each bandwidth filter should be all different to permit a spectrum to be defined. The use of at least eight partitions of the objective lens 7 and eight bandwidth filters 24 is preferred.

It should be understood that the optical image separator takes light coming from an object and forms a plurality of images of that object, all the images falling in the same plane. Because all the images are contained in a single plane, all the images may be projected onto a single sensor array which is fabricated on a single chip. This feature, that each of the plurality of images is formed on a single plane, allows a conventional camera which may be of the high-speed type, but could be of any type including the type that produces color images, to simultaneously capture an entire array of images, each image having passed through an optical element such as a filter, or polarizer which is different from some or all of the other images in the array.

It should be understood that the optical image separator employs optics which not only place the images on the same plane but brings the images into close proximity so that the images will occupy the relatively small area of the chip based sensor array. By dividing a single lens into a plurality of parts, which can be wedge shaped, lens elements are created which, unlike conventional lenses, direct the image formed inwardly towards the common axis of the original lens element which is cut to form the plurality of objective lens parts. A plurality of wedges in front of a single objective performs the same function in a substantially different way by effectively directing the light forming the image into the objective from different angles. Again, the wedges allow the formation of a plurality of closely spaced images which are nevertheless coplanar. These two conditions: closely spaced and coplanar, are necessary to take advantage of existing cameras which have a single sensor array.

It is understood that the invention is not limited to the particular construction and arrangement of parts herein illustrated and described, but embraces such modified forms thereof as come within the scope of the following claims.

We claim:

1. An optical image separator comprising:
   an objective lens partitioned into a plurality of parts, such that the objective lens is capable of reproducing a plurality of output beams from a single input beam, each of the plurality of output beams forming an image, each image formed lying in a common plane;
   a plurality of optical elements, wherein each of the plurality of objective lens parts is associated with one of the plurality of optical elements, so that each of the plurality of output beams is modified by one of the plurality of optical elements;
   a recording device for the simultaneous capture of each of the of images formed by the plurality of output beams.

2. The optical image separator of claim 1 wherein each optical element includes a birefringent plate producing relative retardations.

3. The optical image separator of claim 1 wherein each optical element includes a polarizer acting as an analyzing element.

4. The optical image separator of claim 1 wherein each optical element includes a birefringent quarter wave plate.

5. The optical image separator of claim 1 wherein each optical element includes a narrow bandwidth filter, thus allowing spectral analysis on the input image.

6. The optical image separator of claim 1 wherein said objective lens is partitioned into four parts.

7. The optical image separator of claim 1 wherein said objective lens is partitioned into six parts.

8. The optical image separator of claim 1 wherein said objective lens is partitioned into eight parts.

9. The optical image separator of claim 1 wherein said output beams are of equal intensity.

10. The optical image separator of claim 1 wherein said recording device is a CCTV/CCD camera.

11. The optical image separator of claim 1 wherein said recording device is a high-speed camera.

12. The optical image separator of claim 1 wherein said recording device is of the type which is capable of recording color or RGB images.

13. The optical image separator of claim 1 wherein said objective lens is partitioned into a plurality of radially defined segments which are radially outwardly spaced.

14. An optical image separator as in claim 1, wherein said objective lens consists of a Fresnel lens cut into a plurality of segments which are radially spaced.

15. The optical image separator of claim 13 where the radial movement of the segments is equal.

16. The optical image separator of claim 14 where the radial movement of the segments is equal.

17. The optical image separator of claim 13 where the size of the segments is equal.

18. The optical image separator of claim 14 where the size of the segments is equal.

19. The optical image separator of claim 1 further comprising a condensing lens positioned in front of the objective lens.

20. The optical image separator of claim 1 wherein the optical element is positioned in front of the objective lens.

21. The optical image separator of claim 1 wherein the optical element is positioned behind the objective lens.

22. An optical image separator comprising:
   an objective lens combined with a plurality of wedge prisms, such that the combined effect of the prisms and objective lens is to produce one output beam from each of the plurality of wedge prisms, and each output beam forming an image, each image formed lying in a common plane;
   a plurality of optical elements, wherein each of the plurality of wedge prisms is associated with one of the plurality of optical elements, so that each of the plurality of output beams is modified by one of the plurality of optical elements;
   a recording device for the simultaneous capture of each of the images formed by the plurality of output beams wherein each optical element includes a birefringent plate producing relative retardations.

23. An optical image separator comprising:
   an objective lens combined with a plurality of wedge prisms, such that the combined effect of the prisms and objective lens is to produce one output beam from each of the plurality of wedge prisms, and each output beam forming an image, each image formed lying in a common plane;
   a plurality of optical elements, wherein each of the plurality of wedge prisms is associated with one of the plurality of optical elements, so that each of the plurality of output beams is modified by one of the plurality of optical elements;
   a recording device for the simultaneous capture of each of the images formed by the plurality of output beams wherein each optical element includes a polarizer acting as an analyzing element.

24. An optical image separator comprising:
   an objective lens combined with a plurality of wedge prisms, such that the combined effect of the prisms and objective lens is to produce one output beam from each of the plurality of wedge prisms, and each output beam forming an image, each image formed lying in a common plane;
   a plurality of optical elements, wherein each of the plurality of wedge prisms is associated with one of the plurality of optical elements, so that each of the plurality of output beams is modified by one of the plurality of optical elements;
   a recording device for the simultaneous capture of each of the images formed by the plurality of output beams wherein each optical element includes a birefringent quarter wave plate.

25. An optical image separator comprising:

an objective lens combined with a plurality of wedge prisms, such that the combined effect of the prisms and objective lens is to produce one output beam from each of the plurality of wedge prisms, and each output beam forming an image, each image formed lying in a common plane;

a plurality of optical elements, wherein each of the plurality of wedge prisms is associated with one of the plurality of optical elements, so that each of the plurality of output beams is modified by one of the plurality of optical elements;

a recording device for the simultaneous capture of each of the images formed by the plurality of output beams wherein each optical element includes a narrow bandwidth filter, thus allowing spectral analysis on the input image.

26. An optical image separator comprising:

an objective lens combined with a plurality of wedge prisms, such that the combined effect of the prisms and objective lens is to produce one output beam from each of the plurality of wedge prisms, and each output beam forming an image, each image formed lying in a common plane;

a plurality of optical elements, wherein each of the plurality of wedge prisms is associated with one of the plurality of optical elements, so that each of the plurality of output beams is modified by one of the plurality of optical elements;

a recording device for the simultaneous capture of each of the images formed by the plurality of output beams wherein wedge prisms are arranged to produce six images.

27. An optical image separator comprising:

an objective lens combined with a plurality of wedge prisms, such that the combined effect of the prisms and objective lens is to produce one output beam from each of the plurality of wedge prisms, and each output beam forming an image, each image formed lying in a common plane;

a plurality of optical elements, wherein each of the plurality of wedge prisms is associated with one of the plurality of optical elements, so that each of the plurality of output beams is modified by one of the plurality of optical elements;

a recording device for the simultaneous capture of each of the images formed by the plurality of output beams wherein the wedge prisms are arranged to produce eight images.

28. An optical image separator comprising:

an objective lens combined with a plurality of wedge prisms, such that the combined effect of the prisms and objective lens is to produce one output beam from each of the plurality of wedge prisms, and each output beam forming an image, each image formed lying in a common plane;

a plurality of optical elements, wherein each of the plurality of wedge prisms is associated with one of the plurality of optical elements, so that each of the plurality of output beams is modified by one of the plurality of optical elements;

a recording device for the simultaneous capture of each of the images formed by the plurality of output beams wherein said recording device is a CCTV/CCD camera.

29. An optical image separator comprising:

an objective lens combined with a plurality of wedge prisms, such that the combined effect of the prisms and objective lens is to produce one output beam from each of the plurality of wedge prisms, and each output beam forming an image, each image formed lying in a common plane;

a plurality of optical elements, wherein each of the plurality of wedge prisms is associated with one of the plurality of optical elements, so that each of the plurality of output beams is modified by one of the plurality of optical elements;

a recording device for the simultaneous capture of each of the images formed by the plurality of output beams, wherein said recording device is of the type which is capable of recording color or RGB images.

30. An optical image separator comprising:

an objective lens combined with a plurality of wedge prisms, such that the combined effect of the prisms and objective lens is to produce one output beam from each of the plurality of wedge prisms, and each output beam forming an image, each image formed lying in a common plane;

a plurality of optical elements, wherein each of the plurality of wedge prisms is associated with one of the plurality of optical elements, so that each of the plurality of output beams is modified by one of the plurality of optical elements;

a recording device for the simultaneous capture of each of the images formed by the plurality of output beams, wherein said recording device is a high-speed camera.

31. An optical image separator comprising:

an objective lens combined with a plurality of wedge prisms, such that the combined effect of the prisms and objective lens is to produce one output beam from each of the plurality of wedge prisms, and each output beam forming an image, each image formed lying in a common plane;

a plurality of optical elements, wherein each of the plurality of wedge prisms is associated with one of the plurality of optical elements, so that each of the plurality of output beams is modified by one of the plurality of optical elements;

a recording device for the simultaneous capture of each of the images formed by the plurality of output beams further comprising a condensing lens positioned in front of the objective lens.

32. An optical image separator comprising:

an objective lens combined with a plurality of wedge prisms, such that the combined effect of the prisms and objective lens is to produce one output beam from each of the plurality of wedge prisms, and each output beam forming an image, each image formed lying in a common plane;

a plurality of optical elements, wherein each of the plurality of wedge prisms is associated with one of the plurality of optical elements, so that each of the plurality of output beams is modified by one of the plurality of optical elements;

a recording device for the simultaneous capture of each of the images formed by the plurality of output beams, wherein the optical element is positioned in front of the objective lens.

33. An optical image separator comprising:

an objective lens combined with a plurality of wedge prisms, such that the combined effect of the prisms and objective lens is to produce one output beam from each of the plurality of wedge prisms, and each output beam forming an image, each image formed lying in a common plane;

a plurality of optical elements, wherein each of the plurality of wedge prisms is associated with one of the plurality of optical elements, so that each of the plurality of output beams is modified by one of the plurality of optical elements;

a recording device for the simultaneous capture of each of the images formed by the plurality of output beams, wherein the optical element is positioned behind the objective lens.

* * * * *